(12) United States Patent
Wang et al.

(10) Patent No.: US 8,042,128 B2
(45) Date of Patent: Oct. 18, 2011

(54) SLOT-IN OPTICAL DISK DRIVE

(75) Inventors: Yu-Sheng Wang, Guishan Shiang (TW); Yu-Ming Chang, Guishan Shiang (TW); Jen-Chen Wu, Guishan Shiang (TW)

(73) Assignee: Quanta Storage Inc. (TW)

( * ) Notice: Subject to any disclaimer, the term of this patent is extended or adjusted under 35 U.S.C. 154(b) by 329 days.

(21) Appl. No.: 12/492,758

(22) Filed: Jun. 26, 2009

(65) Prior Publication Data

US 2010/0077416 A1 Mar. 25, 2010

(30) Foreign Application Priority Data

Sep. 23, 2008 (TW) ................. 97136581 A

(51) Int. Cl.
*G11B 7/08* (2006.01)
(52) U.S. Cl. ...................................... 720/647
(58) Field of Classification Search ............ 720/647
See application file for complete search history.

(56) References Cited

U.S. PATENT DOCUMENTS

| 7,080,390 | B2 * | 7/2006 | Toyama et al. | 720/659 |
| 7,107,603 | B2 * | 9/2006 | Tuchiya | 720/713 |
| 7,576,946 | B2 * | 8/2009 | Fujisawa | 360/99.06 |
| 2008/0010650 | A1 * | 1/2008 | Fujisawa | 720/623 |
| 2008/0250438 | A1 * | 10/2008 | Chiou et al. | 720/620 |

* cited by examiner

*Primary Examiner* — Mark Blouin
(74) *Attorney, Agent, or Firm* — Rabin & Berdo, PC

(57) ABSTRACT

The invention is to provided an emergency ejection device for a slot-in optical drive, which utilizes a feeding motor to rotate a transmission shaft from one end of the transmission shaft without self-locking. The other end of the transmission shaft extending to the front of the drive forms as a pincer-like slot, and a worm is disposed between the two ends. One end of a gear set having a plurality of gears drives a clamping unit, and the other end rotates a roller. A worm wheel is disposed on one of the gears in the middle of the gear set and is engaged with the worm with self-locking so that the transmission shaft can be rotated by hand to eject a disk.

9 Claims, 3 Drawing Sheets

SLOT-IN OPTICAL DISK DRIVE

This application claims the benefit of Taiwan application Serial No. 97136581, filed Sep. 23, 2008, the subject matter of which is incorporated herein by reference.

BACKGROUND OF THE INVENTION

1. Field of the Invention

The invention relates in general to a slot-in optical disk drive, and more particularly to an emergency ejection device for a slot-in optical disk drive which can be operated by hand to eject a disk when the optical disk drive malfunctions or when there is power outage.

2. Description of the Related Art

A slot-in optical disk drive utilizes a gear set to drive a rod, a roller or a wheel belt to guide the insertion or ejection of a disk. When it fails to eject a disk, the casing of the slot-in optical disk drive has to be opened in order to take out the disk. However, it is hard to disassemble the precision slot-in optical disk drive for a general user. Especially for the slot-in drive disposed on an automobile audio system, a computer or a home theater system, a professional need to open the mainframe first, and then the slot-in disk drive can be disassembled to take out the disk.

FIG. 1 illustrates a conventional emergency ejection device for a slot-in optical disk drive according to Taiwan Patent No. 092108324. The conventional ejection device 1 includes a power supply unit and a control switch 3 to turn on or off a power supply to rotate a driving gear 2 on the front end. When in use, the driving gear 2 on the front end of the ejection device 1 is inserted in the slot-in optical disk drive. The driving gear 2 meshes with a worm 5 of a feeding motor 4 in the slot-in optical disk drive. The control switch 3 is turned on to rotate the driving gear 2 for driving the worm 5 of the feeding motor 4. A worm wheel 6 drives a gear set 7 which links a roller. As a result, the roller is driven to rotate for inserting or ejecting a disk, and a clamping unit is driven to clamp or release the disk.

The transmission of the low-lead worm 5 and the worm wheel 6 has self-locking property. In other words, when the worm 5 rotates, the worm wheel 6 is driven to rotate as well. However, when the worm wheel 6 rotates, the worm 5 is not driven to rotate. The slot-in optical disk drive utilizes this character to stabilize the driven parts, so that the parts do not move due to vibration, for prevent the slot-in disk drive from being affected. The conventional ejection device 1 for a slot-in optical disk drive needs to mesh with the worm 5 to rotate the gear set 7. The gear set 7 includes eight gears with different gear ratios linking each other. The conventional ejection device 1 for a slot-in optical disk drive rotates the worm 5 by power, and the worm 5 needs to rotate more than 200 revolutions to eject a complete disk. The ejection device 1 is a unique tool which is not available everywhere. When using an optical disk drive, a general user does not purchase an ejection device. Further, the user does not carry the bulky ejection device everywhere. When malfunctioning, the optical disk drive has to be sent to a repair center for taking out the disk. Even a professional can not use a general tool to force eject the disk from the slot of the slot-in optical disk drive and has to disassemble the mainframe to take out the disk. Furthermore, the gear for rotating the roller in the gear set 7 still meshes with the gear set 7 when the rollers ascend or descends, which increases the resistance against the ejection of the disk. Therefore, there is still a lot of limitation to be solved in the use of conventional emergency ejection device for a slot-in optical disk drive.

SUMMARY OF THE INVENTION

An object of the invention is directed to an emergency ejection device of a slot-in optical disk drive. A transmission shaft is used for changing the engaging location of a worm and a gear set, for accelerating the ejection of a disk.

Another object of the invention is directed to an emergency ejection device for a slot-in optical disk drive. An operation end of a transmission shaft forms as a pincer-like slot, so that a general tool can rotate the transmission shaft for ejecting a disk by hand.

A further object of the invention is directed to an emergency ejection device for a slot-in optical disk drive. After a disk is in the operation position, a descending roller drives a gear above the roller to be separated from the gear set, for reducing the resistance against the manual disk ejection.

According to the present invention, an emergency ejection device for a slot-in optical disk drive is provided. The device is disposed on a side of a casing of the slot-in optical disk drive. A feeding motor rotates transmission shaft from one end of the transmission shaft without self-locking. The other end of the transmission shaft extending to the front of the slot-in optical disk drive forms as a pincer-like slot. A worm wheel is disposed between the two ends. One end of a gear set having a plurality of gears drives a clamping unit, and the other end rotates a roller. A worm disposed on one of the gears in the middle of the gear set. The worm is engaged with the worm wheel with self-locking so that the gear set is driven through the engagement of the worm and the worm wheel.

The feeding motor is fastened on the rear of the casing. The transmission shaft is fastened by a bearing and disposed along a front-rear direction of the slot-in optical disk drive. The pincer-like slot of the transmission shaft extends to the front of the casing and faces an emergency ejection hole. The gear set orderly includes a first gear, a second gear, a third gear, a fourth gear and a fifth gear. The first gear is disposed on the roller. A sub-gear is coaxially disposed on the fifth gear and is connected to a linkage plate. The linkage plate is moved to drive the clamping unit to clamp the disk. The third gear is coaxially connected with a worm engaging the worm wheel. An inclined slot is formed on the linkage plate. One end of the roller is connected to the inclined slot and is moved along the inclined slot. The first gear disposed on the roller is separated from or is engaged with the second gear.

The invention will become apparent from the following detailed description of the preferred but non-limiting embodiments. The following description is made with reference to the accompanying drawings.

DETAILED DESCRIPTION OF THE INVENTION

Preferred embodiment is described as follows with reference to the accompanying drawings to illustrate the technical means adopted by the present invention.

Figure 1:
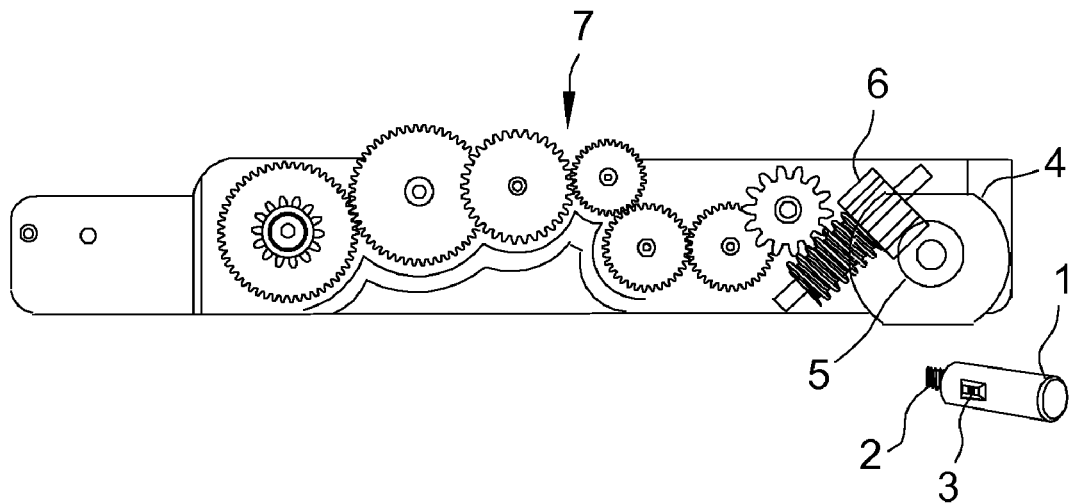
FIG. 1 shows a side view of a conventional emergency ejection device for a slot-in optical disk drive.
Figure 2:
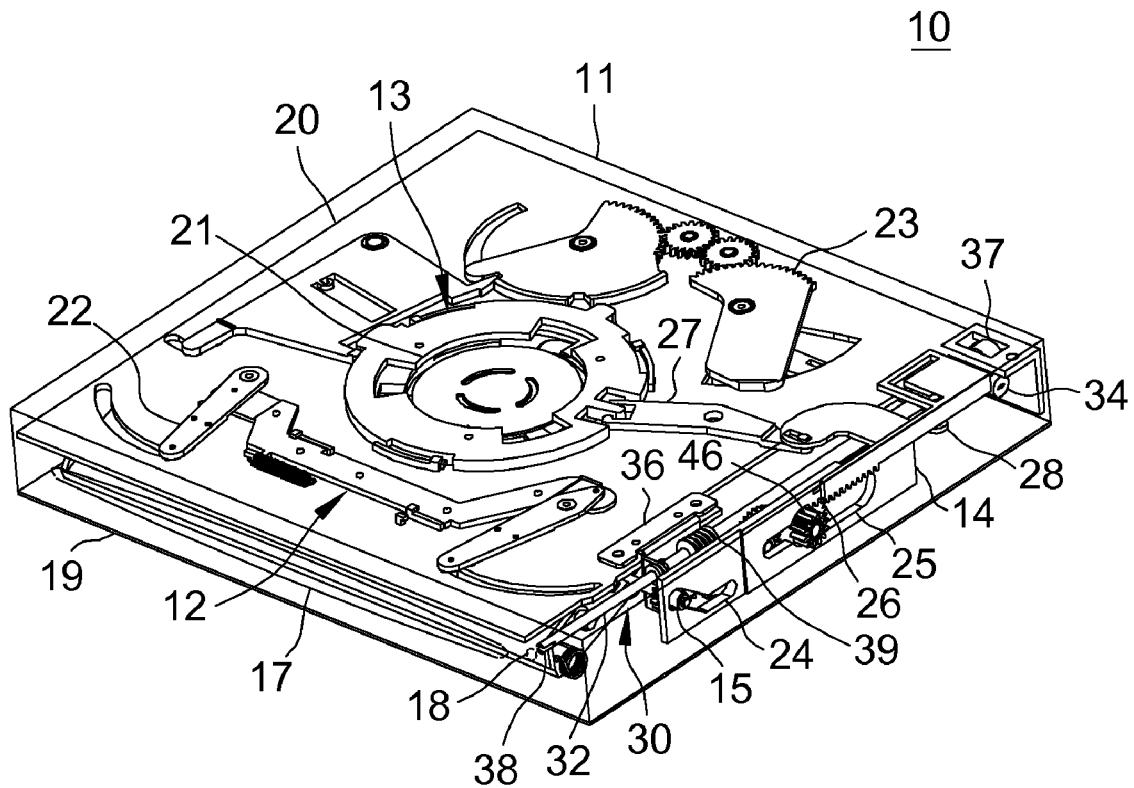
FIG. 2 shows a three-dimensional view of an emergency ejection device for a slot-in optical disk drive according to the present invention.

Please refer to FIG. 2. FIG. 2 illustrates an emergency ejection device for a slot-in optical disk drive 10 according to the present invention. The slot-in optical disk drive 10 is a roller-type optical disk drive and mainly includes a casing 11, a positioning unit 12, a clamping unit 13, a linkage plate 14, a roller 15 and an emergency ejection device 30. The casing 11 is hollow. An opening 17, which is a long slot, is formed on the front for inserting or ejecting a disk. An emergency ejection hole 18 is formed adjacent to one end of the opening 17. The bottom of the casing 11 is a bottom plate 19 which is covered with a base plate 20. A penetrating hole 21 is formed at the center of the base plate 20. A disk can be placed between the bottom plate 19 and the base plate 20.

The positioning unit 12 is disposed on the base plate 20 and includes a front positioning part 22 and a rear positioning part 23. The front positioning part 22 and the rear positioning part 23 open and close synchronously and are formed symmetrically, for guiding the disk to be automatically aligned with a positioning point in the casing 11. The clamping unit 13 is disposed in the penetrating hole 21 of the base plate 20. The disk positioned in the casing 11 is clamped or released by the clamping unit 13 through the penetrating hole 21. The linkage plate 14 is disposed on a side of the casing 11. An inclined slot 24 is formed on the front part of the linkage plate 14, and a straight slot 25 is formed on the rear part. A rack 26 is disposed on the upper edge of the straight slot 25. The linkage plate 14 rotates the clamping unit 13 by a small angle through a connecting rod 27. A lever 28 links the rear end of the linkage plate 14. The lever 28 extends to the rear side of the casing 11. Moreover, the roller 15 is disposed between the bottom plate 19 and the base plate 20 and disposed laterally in the casing 11 near the opening 17. One end of the roller 15 engages the inclined slot 24. The slot-in optical disk drive 10 utilizes the gear set to move the linkage plate 14, so that the inclined slot 24 drives the roller 15 to ascend or descent and rotate. The structure and operation of the above-described casing 11, the positioning unit 12, the clamping unit 13, the linkage plate 14 and the roller 15 are the same as the insertion and ejection mechanisms of the conventional slot-in optical disk drive and are only used for illustrating the related operation of the present invention. These components are not the technical characters of the present invention and therefore are not described redundantly.

Figure 3:
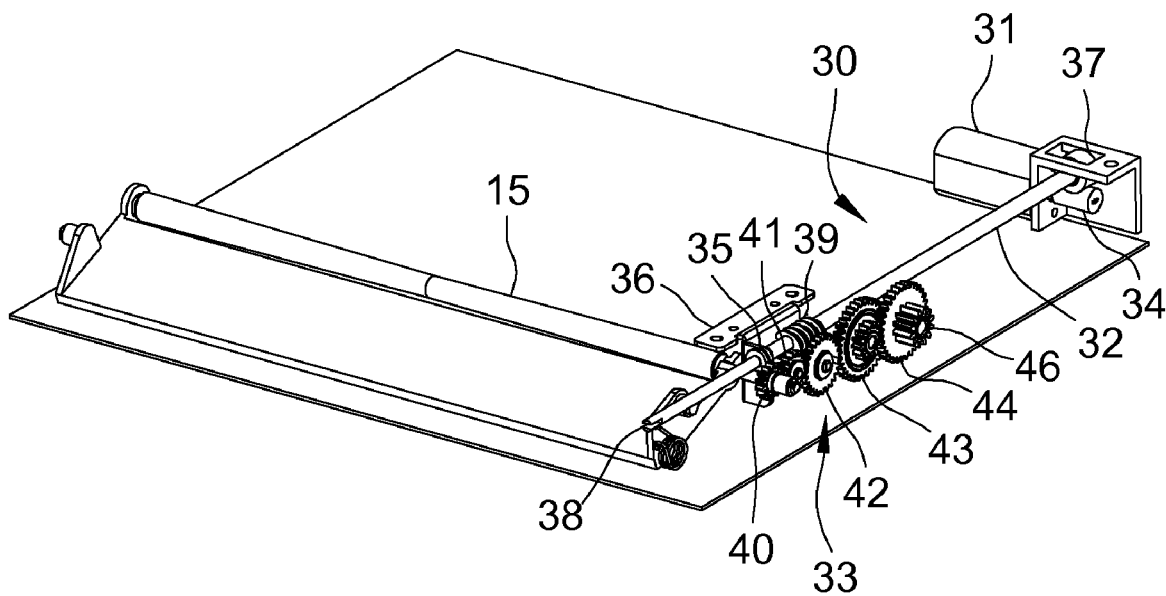
FIG. 3 shows a three-dimensional view of the emergency ejection device of the present invention.
Figure 4:
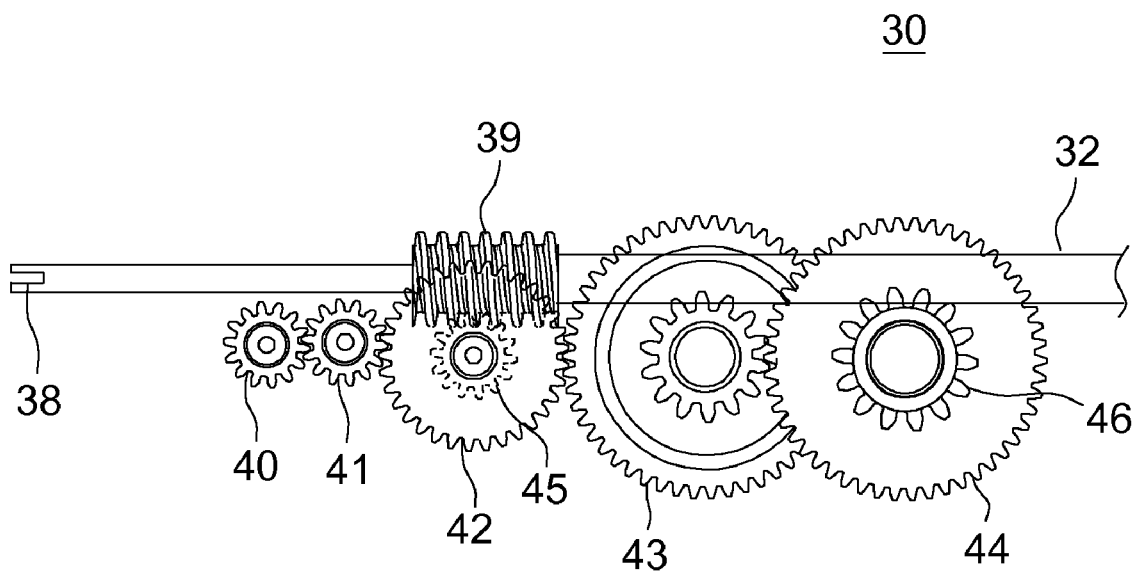
FIG. 4 is a partial enlarged view of the emergency ejection device of the present invention.

Please refer to FIG. 2, FIG. 3 and FIG. 4 at the same time. FIG. 3 shows the structure of the emergency ejection device 30 of the present invention. FIG. 4 is a partial enlarged view of the emergency ejection device 30 of the present invention. The emergency ejection device 30 of the present invention is disposed on a side of the casing 11 and near the inner side of the linkage plate 14. The emergency ejection device 30 mainly includes a feeding motor 31, a transmission shaft 32 and a gear set 33. The feeding motor 31 is fastened on the rear of the casing 11. The feeding motor 31 rotates a driving gear 34. The transmission shaft 32 is fastened by a bearing 35 and is disposed along the front-rear direction of the casing 11. The bearing 35 is fastened on a supporting plate 36 of the base plate 19. A driven gear 37 disposed on one end of the transmission shaft 32 engages the driving gear 34, so that the transmission shaft 32 is rotated by the feeding motor 31. The driven gear 37 and the driving gear 34 are a combination of high-lead worm wheel, worm or bevel gear without self-locking. The other end of the transmission shaft 32 extending to the emergency ejection opening 18 on the front of the casing 11 forms as a pincer-like slot 38. A worm wheel 39 is disposed on the transmission shaft 32 between the driven gear 37 and the pincer-like slot 38.

The gear set 33 includes a plurality of gears meshing with each other and is disposed on the casing 11. The gear set 33 is adjacent to and parallel to the transmission shaft 32. The transmission shaft 32 engages one of the gears in the middle of the gear set 33. For example, the gear set 33 orderly includes the first gear 40, the second gear 41, the third gear 42, the fourth gear 43 and the fifth gear 44. The third gear 42 is coaxially connected with the worm wheel 45. The worm 39 disposed on the transmission shaft 32 engages the worm wheel 45 with self-locking for driving the gear set 33. The third gear 42 drives the second gear 41 in the direction toward the front of the slot-in optical disk drive 10 and the second gear 41 drives the first gear 40, so that the roller 15 is driven to rotate. The third gear 42 drives the fourth gear 43 in the direction toward the rear of the slot-in optical disk drive 10 so as to rotate the fifth gear 44. The fifth gear 44 is coaxially connected with a sub-gear 46 which is engaged with a straight slot 25 of the linkage plate 14.

Figure 5:
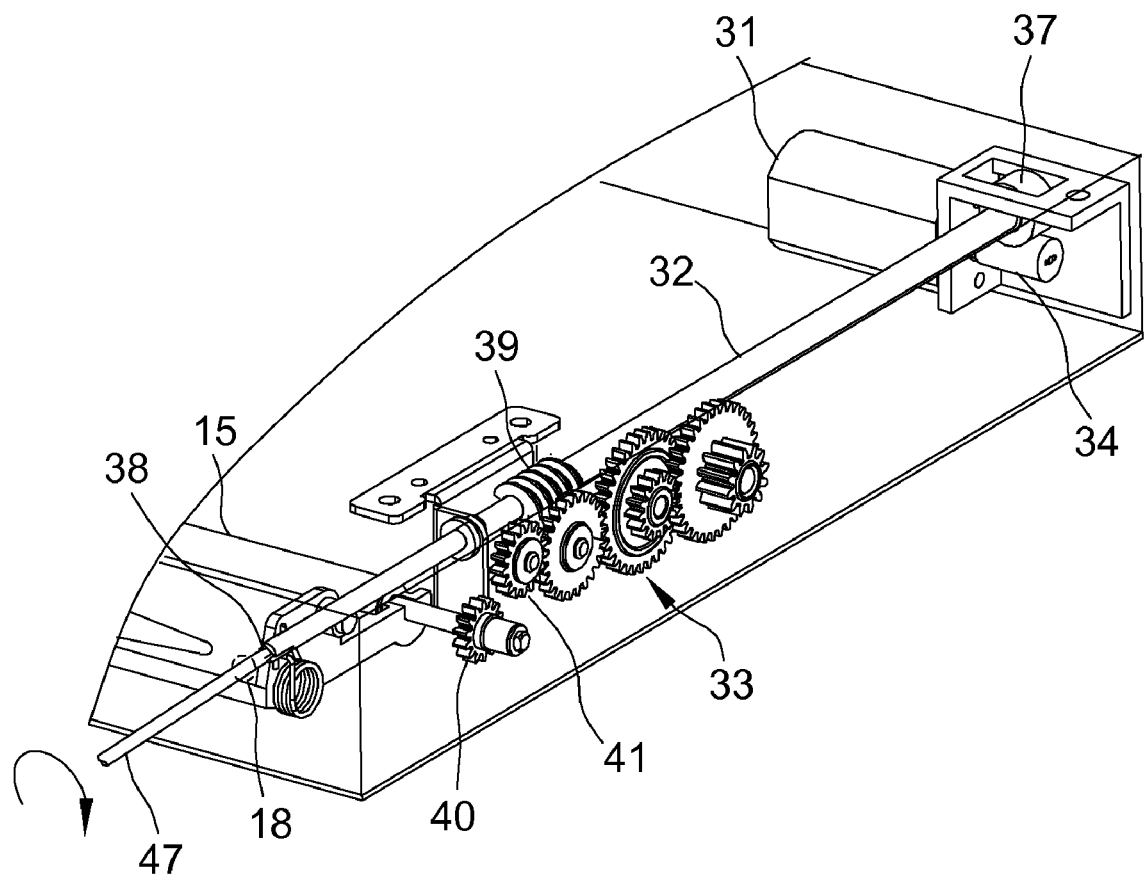
FIG. 5 illustrates the emergency ejection device of the present invention when the roller descends.

When a disk is inserted in the casing 11 through the opening 17, the slot-in optical disk drive 10 activates the feeding motor 31 to rotate the transmission shaft 32. The worm 39 transmits drives the gear set 33, so that the roller 15 is driven to rotate through the third gear 42, the second gear 41 and the first gear 40, for loading the disk into the casing 11. When the disk moves to the rear of the slot-in optical disk drive 10, the lever 28 is pushed so that the linkage plate 14 moves forward. The rack 26 disposed on the straight slot 25 engages the sub-gear 46 and is driven to move forward continuously by the fifth gear 44 of the gear set 33. Then, the connecting rod 27 is driven to rotate the clamping unit 13 to clamp the disk. Please refer to FIG. 5 at the same time. FIG. 5 illustrates descending state of the roller 15. The roller 15 engages one end of the inclined slot 24 and moves along the inclined slot 24. First, the first gear 40 is separated from the second gear 41 to stop rotating, so that the rolling roller 15 does not damage the disk. Next, the roller 15 descends to be separated from the disk, and then the feeding motor 31 is turned off. The slot-in optical disk drive 10 can rotate the disk for reading or writing the disk. The worm 39 of the present invention engages the worm wheel 45 with self-locking. When the slot-in optical disk drive 10 operates normally, the gear set 33 stays still. As a result, the clamping unit 13 does not move to release the disk. Also, the roller 15 is prevented from ascending to contact the disk.

However, when the operating slot-in optical disk drive 10 malfunctions or when there is power outage, the disk remaining in the optical disk drive can be taken out by using a general screwdriver 47 inserted in the emergency ejection hole 18. The screwdriver 47 engages the pincer-like slot 38 on the operation end of the transmission shaft 32. The driving gear 34 and the driven gear 37 of the feeding motor 31 are not self-locking, and the worm 39 is able to rotate the worm wheel 45. As a result, the transmission shaft 32 can be driven to rotate for driving the gear set 33. Furthermore, the first gear 40 is separated from the second gear 41, which reduces the needed force to rotate the roller 15. It is easier to rotate the transmission shaft 32 by the screwdriver 47. Moreover, the worm 39 of the present invention directly engages the worm wheel 45 of the third gear 42, so the level of the gear transmission is reduced. Therefore, it only needs to rotate the screwdriver 47 about 30 revolutions to move backward the linkage plate 14 through the gear set 33. The clamping unit 13 is driven to release the disk, and the first gear 40 returns to engage the second gear 41. The roller 15 rotates to eject the disk, so that a user can take out the disk.

Therefore, the emergency ejection device for a slot-in optical disk drive according to the present invention can change the engaging position of the worm and the gear set through the transmission shaft. The gear in the middle of the gear set transmits motion forward or backward. It is prevented from transmitting motion from one end to the other, which reduces the transmission level of the gear set. The disk can be ejected faster, and the rotation revolution to eject the disk by hand is decreased. Furthermore, the emergency ejection device for a slot-in optical disk drive according to the present invention forms a pincer-like slot on the operation end of the transmission shaft. The pincer-like slot faces the front of the slot-in optical disk drive. The transmission shaft can be driven to rotate by a general tool. Therefore, it is easy to eject the disk by hand. When the disk is in the operation position, the descending roller drives the first gear to be separated from the gear set. The resistance against the rotation of the gear is reduced. As a result, it is convenient to eject the disk by hand.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An emergency ejection device for a slot-in optical disk drive, the device disposed at a side of a casing of the slot-in optical disk drive and comprising:
    a feeding motor;
    a transmission shaft, the feeding motor rotating the transmission shaft from one end of the transmission shaft without self-locking property, the other end of the transmission shaft extended to the front of the slot-in optical disk drive and formed as a pincer-like slot, a worm disposed between the two ends; and
    a gear set comprising a plurality of gears engaged with each other, one end of the gear set driving a clamping unit, the other end rotating a roller, a worm wheel disposed on one of the gears in the middle of the gear set, and the worm wheel is engaged with the worm with self-locking property, so that the gear set is driven through the engagement of the worm wheel and the worm.

2. The emergency ejection device according to claim 1, wherein the feeding motor is fastened on a rear side of the casing, and the transmission shaft is fastened by a bearing and disposed along a front-rear direction of the slot-in optical disk drive.

3. The emergency ejection device according to claim 2, wherein an emergency ejection hole is formed on the front of the casing, and the pincer-like slot of the transmission shaft is extended to and faces the emergency ejection hole.

4. The emergency ejection device according to claim 1, wherein the gear set orderly comprises a first gear, a second gear, a third gear, a fourth gear and a fifth gear, and the third gear is coaxially connected with the worm wheel engaged the worm.

5. The device according to claim 4, wherein the first gear is disposed on the roller, and toward the front of the slot-in optical disk drive, the third gear drives the second gear and the first gear to rotate so that the roller is driven to rotate.

6. The emergency ejection device according to claim 4, wherein a sub-gear is coaxially disposed on the fifth gear and is connected to a linkage plate, and toward the rear of the slot-in optical disk drive, the third gear drives the fourth gear and the fifth gear to rotate so as to moves the linkage plate.

7. The emergency ejection device according to claim 6, wherein a straight slot having a rack engaged with the sub-gear is formed on the linkage plate and the linkage plate is driven to move forward by the fifth gear for driving the clamping unit to clamp a disk.

8. The emergency ejection device according to claim 6, wherein an inclined slot is formed on the linkage plate, and one end of the roller is connected to the inclined slot and moved along the inclined slot so that the first gear disposed on the roller is separated from or engaged with the second gear.

9. The emergency ejection device according to claim 1, wherein the feeding motor rotates a driving gear is engaged with a driven gear without self-locking property on the end of the transmission shaft.

* * * * *